(12) United States Patent
Handshaw et al.

(10) Patent No.: US 12,260,288 B2
(45) Date of Patent: Mar. 25, 2025

(54) BIOPTIC BARCODE READER WITH IMAGING DEVICES

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/636,124

(22) Filed: Apr. 15, 2024

(65) Prior Publication Data

US 2024/0256806 A1 Aug. 1, 2024

Related U.S. Application Data

(63) Continuation of application No. 17/538,471, filed on Nov. 30, 2021, now Pat. No. 11,960,962.

(51) Int. Cl.
*G06K 7/10* (2006.01)
*G06K 7/14* (2006.01)

(52) U.S. Cl.
CPC ....... *G06K 7/10831* (2013.01); *G06K 7/1413* (2013.01)

(58) Field of Classification Search
CPC .......................... G06K 7/10831; G06K 7/1413
See application file for complete search history.

(56) References Cited

U.S. PATENT DOCUMENTS

| 2001/0042789 | A1 | 11/2001 | Krichever et al. |
| 2020/0058199 | A1 | 2/2020 | Barkan et al. |
| 2021/0012076 | A1 | 1/2021 | Barkan et al. |
| 2021/0192163 | A1 | 6/2021 | Handshaw et al. |

FOREIGN PATENT DOCUMENTS

WO 20230101752 A 9/2021

OTHER PUBLICATIONS

U.S. Appl. No. 17/538,471, filed Apr. 16, 2024, Handshaw et al.
International Search Report and Written Opinion for International Application No. PCT/US2022/44803 mailed on Jan. 3, 2023.
Examination Report for Australian Patent Application No. 2022403540 mailed on Apr. 17, 2024.

*Primary Examiner* — Jamara A Franklin
(74) *Attorney, Agent, or Firm* — Yuri Astvatsaturov (57) ABSTRACT

Bioptic barcode readers with multiple imaging devices are disclosed herein. An example bioptic barcode reader includes a housing with a generally horizontal window and an upright window, a barcode reading device positioned within the housing, a first imaging device positioned within the housing, and a second imaging device positioned within the housing below the first imaging device. The first imaging device has a first field-of-view directed out of the upright window, the second imaging device has a second field-of-view directed out of the upright window, and a first central imaging axis of the first field-of-view intersects a second central imaging axis of the second field-of-view at an intersecting angle that is greater than or equal to 15 degrees and less than or equal to 55 degrees. The second central imaging axis of the second field-of-view extends upward above the generally horizontal window at a second angle that is greater than 0 degrees.

8 Claims, 9 Drawing Sheets

BIOPTIC BARCODE READER WITH IMAGING DEVICES

CROSS-REFERENCE TO RELATED APPLICATIONS

The present application is a continuation of U.S. patent application Ser. No. 17/538,471, filed on Nov. 30, 2021, and incorporated herein by reference in its entirety.

BACKGROUND

Typical bioptic barcode readers that include imaging capability usually use a single imaging device, such as color camera, that is located at the top of the bioptic barcode reader and is directed downward through the upright window. However, having only one imaging device with a single field-of-view has various limitations, such as limited views of objects presented, limited or no view of the face of users, etc.

In an effort to address some of the limitations of a single imaging device, some bioptic barcode readers have added a second imaging device that is directed vertically out of the horizontal window, in addition to a first imaging device directed out of the upright window, to capture an alternate angle for objects in order to provide more robust object identification. However, the use of a second imaging device directed out of the horizontal window also has various limitations. For example, the typical small size of the horizontal window in standard bioptic barcode readers requires that the field-of-view of the second imaging device be narrow, which is of limited use.

SUMMARY

In an embodiment, the present invention is a bioptic barcode reader comprising a housing comprising a generally horizontal window and an upright window, a barcode reading device positioned within the housing, a first imaging device positioned within the housing, and a second imaging device positioned within the housing, below the first imaging device. The barcode reading device has a barcode reading field-of-view directed out of the upright window and/or the generally horizontal window. The first imaging has a first field-of-view directed out of the upright window and the second imaging device has a second field-of-view directed out of the upright window. A first central imaging axis of the first field-of-view intersects a second central imaging axis of the second field-of-view at an intersecting angle that is greater than or equal to 15 degrees and less than or equal to 55 degrees and the second central imaging axis of the second field-of-view extends upward above the generally horizontal window at a second angle that is greater than 0 degrees.

In a variation of this embodiment, the first central imaging axis and the second central imaging axis intersect at a point located vertically above the generally horizontal window.

In another embodiment, the present invention is a bioptic barcode reader comprising a housing comprising a generally horizontal window and an upright window, a first imaging device positioned within the housing, and a second imaging device positioned within the housing, below the first imaging device. The first imaging device has a first field-of-view directed out of the upright window along a first central imaging axis that extends downward at a first angle below horizontal and is positioned and configured to view the generally horizontal window within the first field-of-view. The second imaging device has a second field-of-view directed out of the upright window along a second central imaging axis that extends upward at a second angle above horizontal and is positioned and configured to view a face of a user of the bioptic barcode reader.

In a variation of this embodiment, the first central imaging axis intersects the second central imaging axis at an intersecting angle that is greater than or equal to 15 degrees and less than or equal to 55 degrees.

In another variation of this embodiment, the first central imaging axis and the second central imaging axis intersect at a point located vertically above the generally horizontal window.

In another embodiment, the present invention is a bioptic barcode reader comprising a housing comprising a generally horizontal window and an upright window, a carrier frame positioned within the housing, a first imaging device mounted onto the carrier frame, and a second imaging device mounted to the carrier frame. The first imaging device has a first field-of-view directed out of the upright window and the second imaging device has a second field-of-view directed out of the upright window.

In a variation of this embodiment, the carrier frame is a single, integral, unitary part.

In another variation of this embodiment, a first central imaging axis of the first field-of-view intersects a second central imaging axis of the second field-of-view at an intersecting angle that is greater than or equal to 15 degrees and less than or equal to 55 degrees.

In another variation of this embodiment, a first central imaging axis of the first field-of-view and a second central imaging axis of the second field-of-view intersect at a point located vertically above the generally horizontal window.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
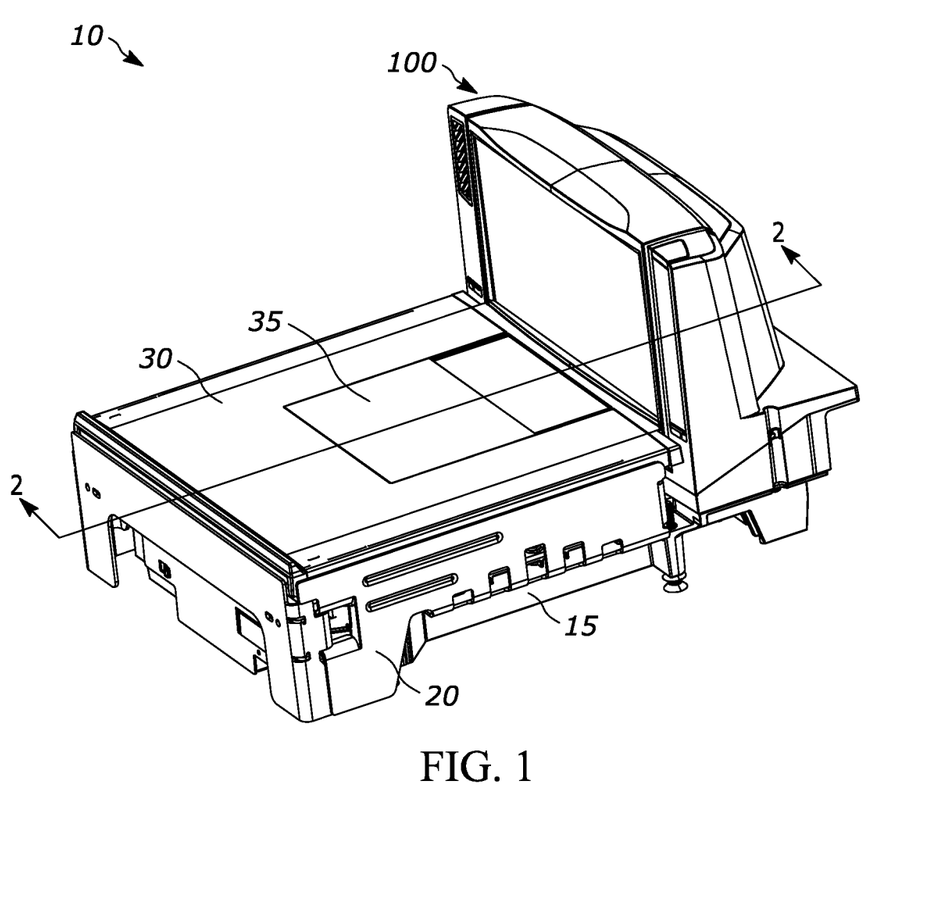
FIG. 1 illustrates a perspective view of an example bioptic barcode reader assembly.
Figure 2:
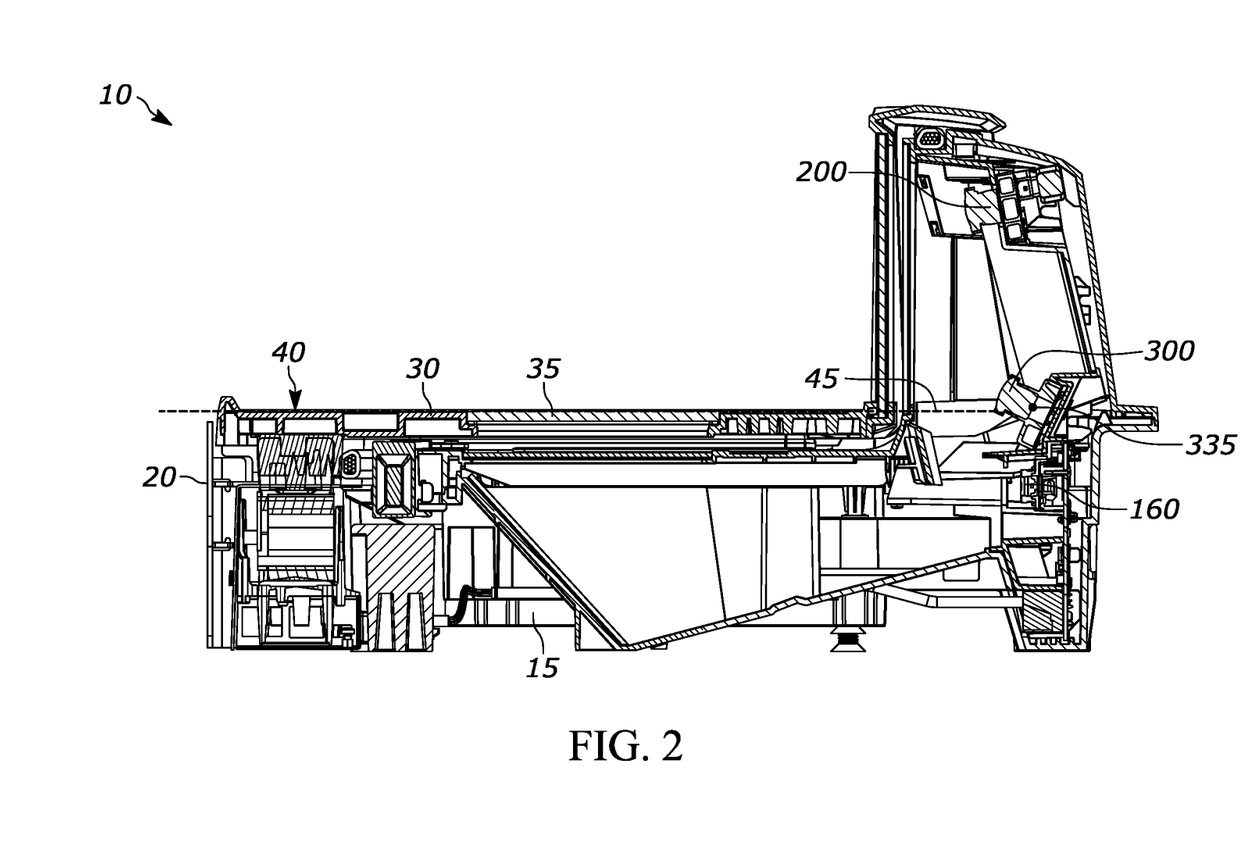
FIG. 2 illustrates a cross-sectional view of the bioptic barcode reader assembly of FIG. 1, taken along line 2-2 of FIG. 1.
Figure 3:
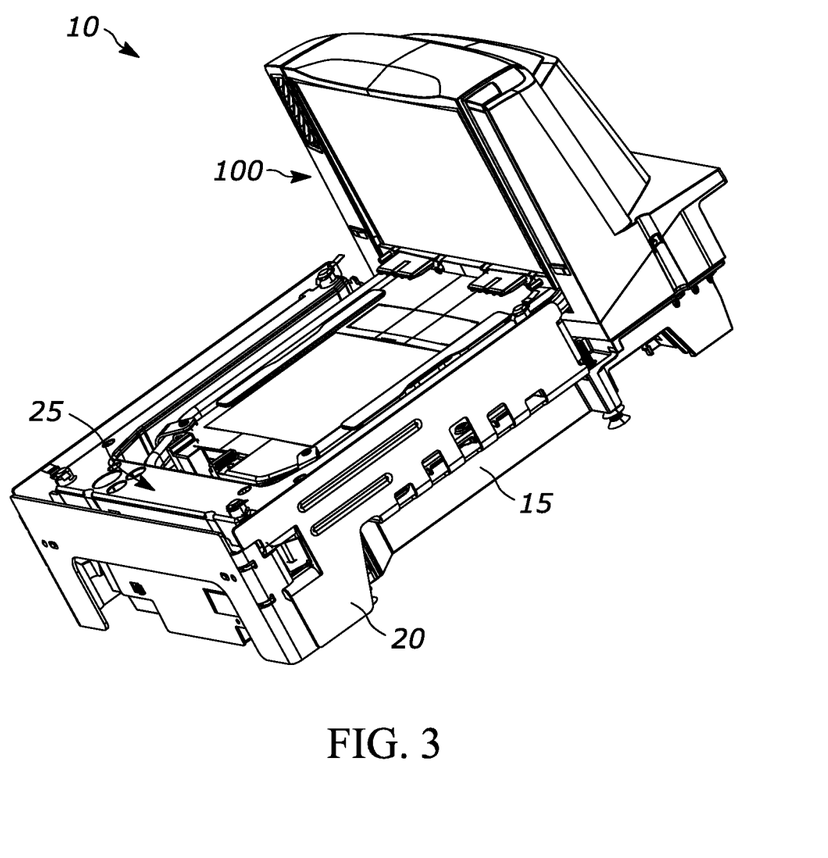
FIG. 3 illustrates a perspective view of the bioptic barcode reader assembly of FIG. 1 with the platter removed.
Figure 4:
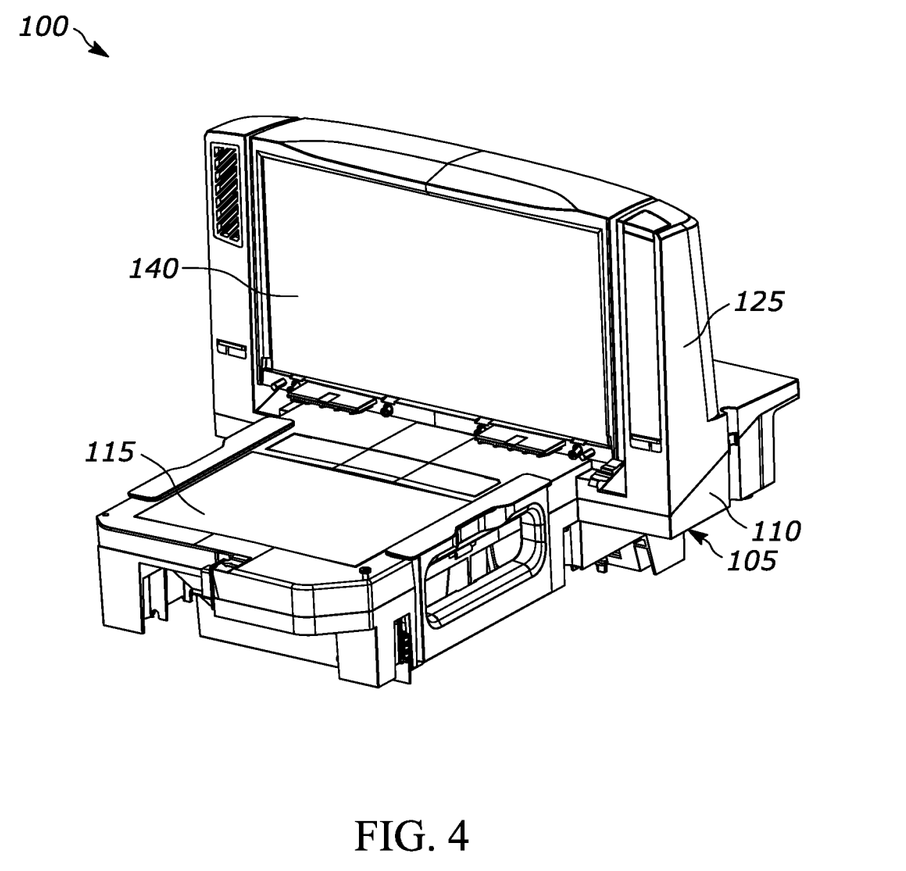
FIG. 4 illustrates a perspective view of an example bioptic barcode reader of the bioptic barcode reader assembly of FIG. 1.
Figure 5:
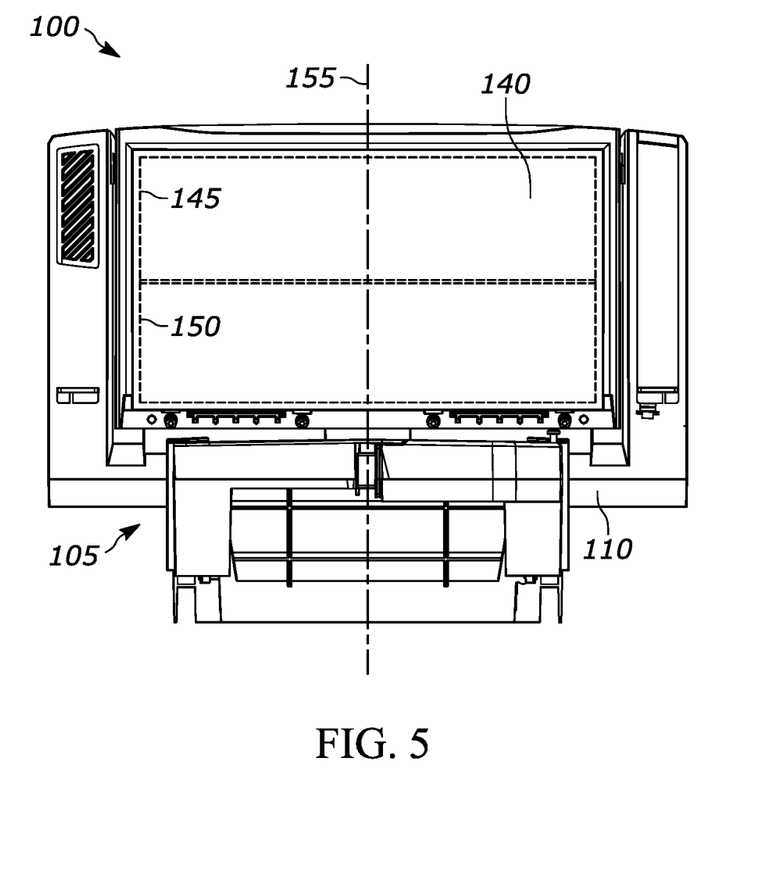
FIG. 5 illustrates a front view of the bioptic barcode reader of FIG. 4.
Figure 6:
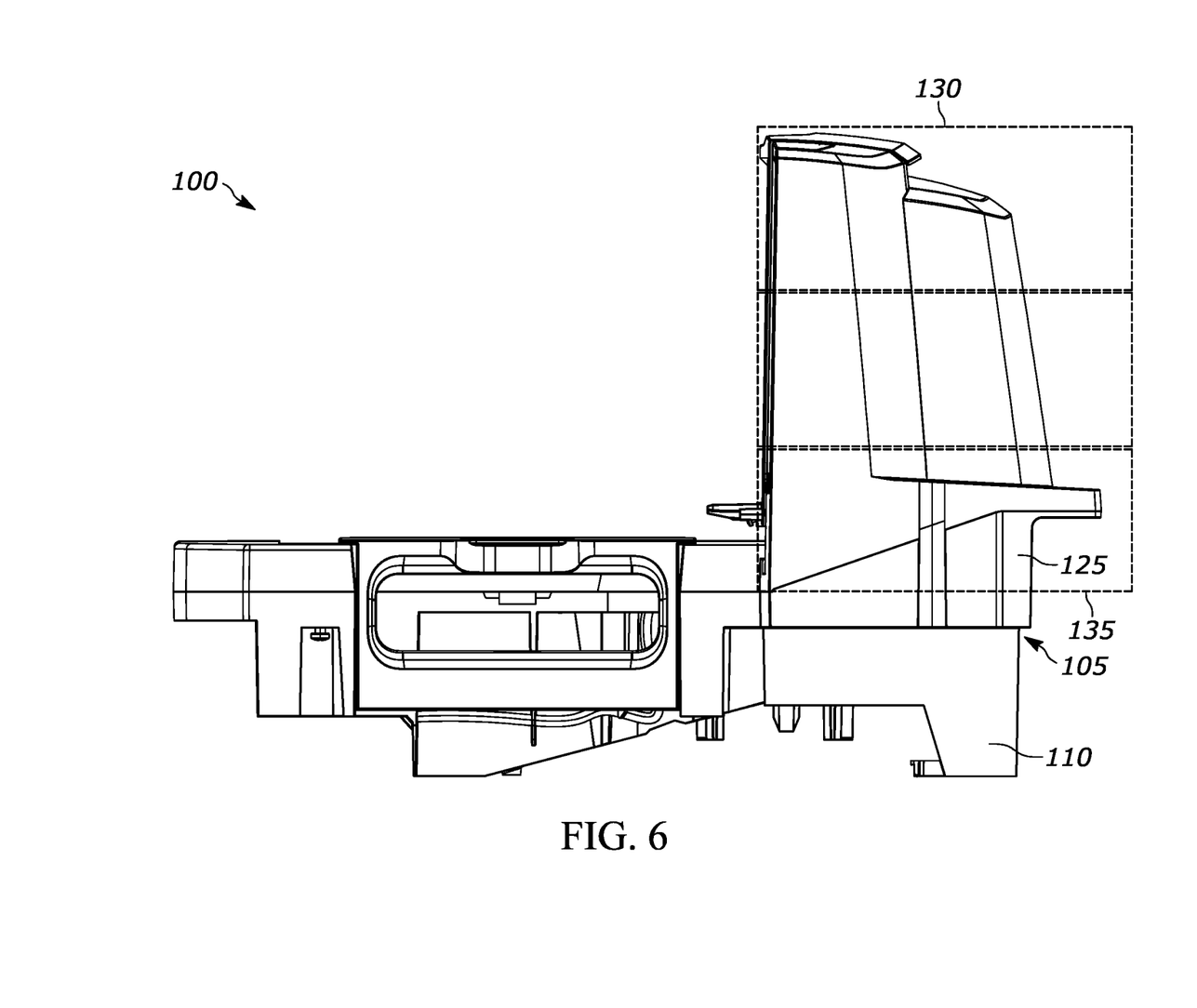
FIG. 6 illustrates a side view of the bioptic barcode reader of FIG. 4.
Figure 7:
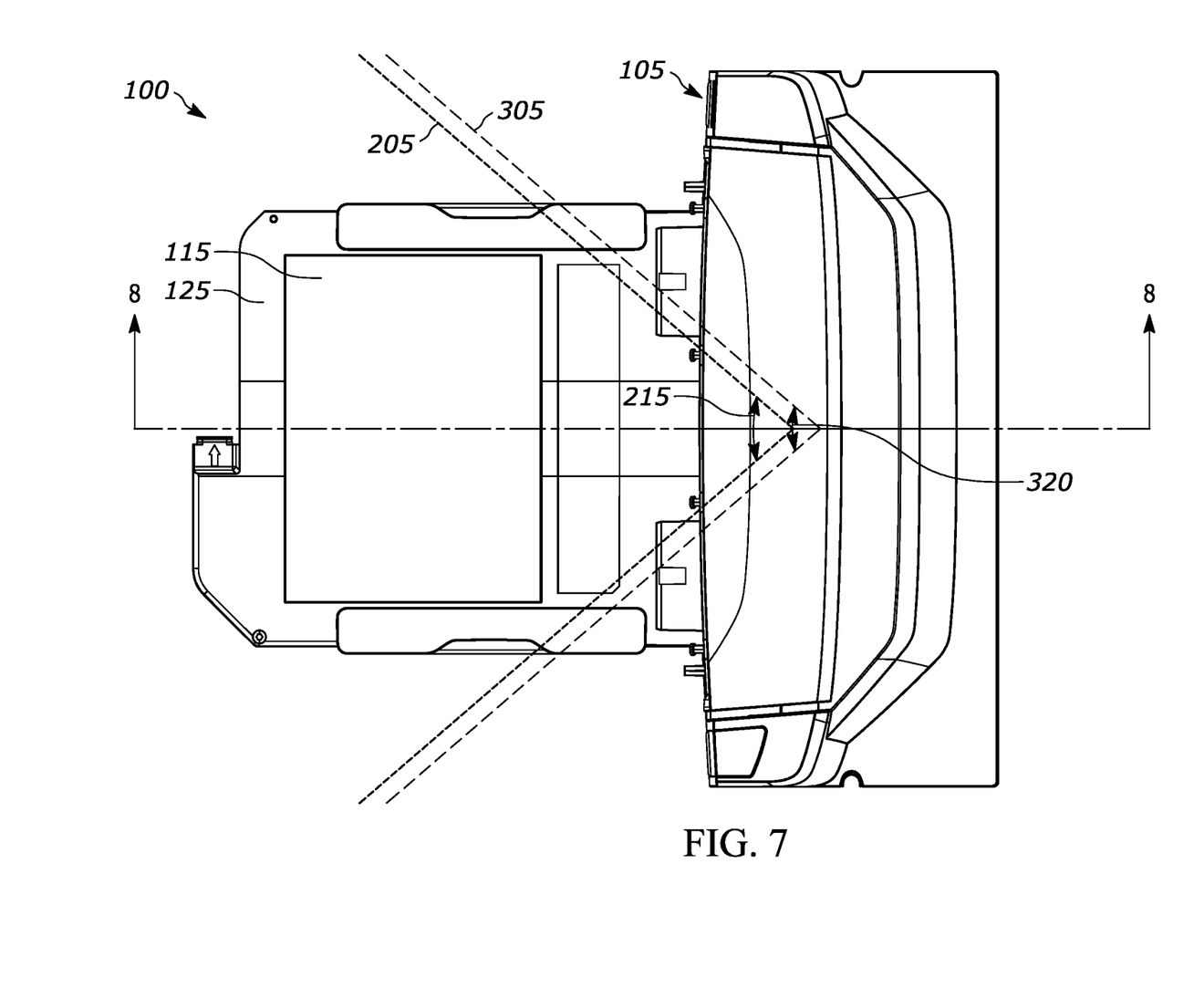
FIG. 7 illustrates a top view of the bioptic barcode reader of FIG. 4.

Referring to FIGS. 1-3, an example bioptic barcode reader assembly 10 is shown that includes an example bioptic barcode reader 100. Bioptic barcode reader assembly 10 can also include a perimeter frame 15 that supports bioptic barcode reader 100 and, depending on the application and installation, a sheet metal frame 20 and a scale assembly 25, which can each be attached to and supported by perimeter frame 15. Perimeter frame 15 is preferably metal and can be rectangular or generally U-shaped and provides structure and support along the sides and front of bioptic barcode reader 100. Sheet metal frame 20 can be a single, integral, unitary part or can include multiple parts that are assembled together, as shown. A platter 30 having a platter window 35 can also be positioned over perimeter frame 15 and scale assembly 25, if used, such that platter window 35 is generally aligned over a generally horizontal window 115 of a housing 105 of bioptic barcode reader 100. In addition, when used as part of bioptic barcode reader assembly 10, scale assembly 25 can be positioned between bioptic barcode reader 100 and sheet metal frame 20 and can engage platter 30 to allow objects placed on platter 30 to be weighed by scale assembly 25.

Referring to FIGS. 4-8, example bioptic barcode reader 100 is shown that includes two imaging devices (e.g., cameras) that can be used to capture images, in addition to one or more barcode reading devices that are used to capture and decode barcodes. Both imaging devices are directed out of an upright window in an upper housing portion or tower of the bioptic barcode reader, which allows both cameras to have the widest possible field-of-view so that both cameras can see substantially to both sides of a platter. In addition, the cameras are substantially vertically aligned with the upper camera looking downwards towards the platter and the lower camera looking upward, as described in more detail below.

In the example shown, bioptic barcode reader 100 includes housing 105, which has a lower housing portion 110, which can be plastic or any other acceptable material, an upper housing portion 125, a generally horizontal window 115, and an upright window 140. Upper housing portion 125 extends upwards from the lower housing portion 110 and is secured to lower housing portion 110, for example by threaded members. Upper housing portion 125 can be a single, integral, unitary part or can include a middle housing portion that extends parallel to lower housing portion 110 and includes generally horizontal window 115 and a tower portion, attached to the middle housing portion, that extends perpendicular to lower housing portion 110 and includes upright window 140. A barcode reading device 160 is positioned within housing 105 and has a barcode reading field-of-view 165 that is split by a splitter mirror and is directed out of upright window 140 and generally horizontal window 115. Alternatively, rather than splitting barcode reading field-of-view 165, the entire barcode reading field-of-view 165 can be directed out of either upright window 140 or generally horizontal window 115 and a second barcode reading device can be positioned within housing with a second barcode reading field-of-view that is directed out of the other of upright window 140 or generally horizontal window 115.

First imaging device 200 and second imaging device 300 are also positioned within housing 105, with second imaging device preferably positioned below first imaging device 200.

First imaging device 200 is preferably positioned in an upper third 130 (FIG. 6) of upper housing portion 125 and has a first field-of-view 205 that is directed out of upright window 140 along first central imaging axis 210. First central imaging axis 210 is preferably directed out of a top half 145 (FIG. 5) of upright window 140 and extends downward below a first plane 225 that is parallel to the generally horizontal window 115 (typically horizontal) at a first angle 230. The absolute value of first angle 230 is greater than 0 degrees, such that first imaging device 200 is positioned and configured to view generally horizontal window 115 within first field-of-view 205. With first field-of-view 205 of first imaging device 200 directed downward, first field-of-view 205 typically will not have a view of the face of a user of average height, which can address possible privacy concerns of some users and also allows more complete illumination of first field-of-view without the concern of shining lights in a user's eyes. In addition, since first field-of-view 205 is usually too low to view the face of a user, if the face of a user is identified in the first field-of-view 205 and a second field-of-view 305 of the second imaging device 300 (directed upward as discussed below), illumination can be dimmed or shut off to avoid eye annoyance for the user. This can be advantageous in cases where children might approach bioptic barcode reader 100.

Second imaging device 300 is preferably positioned in a lower third 135 (FIG. 6) of upper housing portion 125 and has a second field-of-view 305 that is directed out of upright window 140 along second central imaging axis 310. Second central imaging axis 310 is preferably directed out of a bottom half 150 (FIG. 5) of upright window 140 and extends upward above a top surface 40 of generally horizontal window 115 (typically horizontal) at a second angle 315, which is greater than 0 degrees, such that second imaging device 300 is positioned and configured to view a face 500 of a user of bioptic barcode reader 100. A center 335 of second imaging device 300 can also be positioned along a plane 45 that extends along a top surface 40 of platter 30 (as can be seen in FIG. 2) with a bottom border 330 of second field-of-view 305 parallel to a top surface 120 of generally horizontal window 115 and preferably within 0.5 inches of top surface 120. With second field-of-view 305 of second imaging device 300 directed upward, second field-of-view 305 typically will have a good view of the face of a user of average height and the second angular width 320 of second field-of-view 305 allows second field-of-view 305 to view the face of the user even if the user is standing significantly to the left or right of center. This feature can be beneficial for a number of applications, such as facial recognition, mask detection, etc. In addition to being optimized for facial views, directing second field-of-view 305 of second imaging device 300 upward also allows second field-of-view 305 to view very tall objects (e.g., greater than 11 inches high at a middle of generally horizontal window 115) for even better object recognition performance.

With both first field-of-view 205 of first imaging device 200 and second field-of-view 305 of second imaging device 300 looking generally forward out of upright window 140, first imaging device 200 and second imaging device 300 can pick out a feature on a user or an object, and, by using known parallax between first imaging device 200 and second imaging device 300, a distance of the user or object from upper housing portion 125 can be calculated. This determination of the distance of a user or object from upper housing portion 125 can be used to implement a number of features, such as changing scan settings to improve barcode reading at varying distances, turning on the system when a user approaches to within a preset distance, waking up the system when a user approaches to within a preset distance, differentiating between similar looking objects of different sizes, determining an item's dimensions and either comparing the dimensions against a known database or help generate said database (useful for ticket switching prevention), improving object recognition by differentiating background features from features on a user or object, determining the distance of a part of an object crossing a threshold of platter 30 to determine whether the object is off platter during a weighing event, etc. As used herein, turning on the system means getting the system ready for use by a user, such as activating a screen, showing user instructions, etc. Waking up the system means getting the system ready to scan after the system has been turned on, such as activating the barcode reading device. Once the system has been turned on and the system has been woken up, the system is then ready for decoding, which is actually capturing image and decoding barcodes within the captured images.

In addition, since first field-of-view 205 of first imaging device 200 and second field-of-view 305 of second imaging device 300 are directed out of upright window 140 at substantially different angles (first field-of-view 205 directed downward and second field-of-view 305 directed upward), it is possible to see more than one side of an object, which makes it much more difficult to trick the system when ticket switching. In fact, at the extremes of the first field-of-view 205 and second field-of-view 305 closest to upright window 140, the first imaging device 200 and second imaging device 300 can look at an object with a 110 degree angle difference close to upright window 140.

In the example shown, first field-of-view 205 has a first angular width 215 (FIG. 7) that is preferably greater than 80 degrees and is greater than a first angular height 220 (FIG. 8) of first field-of-view 205 and second field-of-view 305 has a second angular width 320 (FIG. 7) that is preferably greater than 80 degrees and is greater than a second angular height 325 (FIG. 8) of second field-of-view 305. In the particular example shown, first angular width 215 and second angular width 320 are each 100 degrees and first angular height 220 and second angular height 325 are each 70 degrees. With the wide angular widths of both first field-of-view 205 and second field-of-view 305, both first imaging device 200 and second imaging device 300 can see substantially to the sides of platter 30, which can improve the view of objects during instances of scan avoidance and can monitor for object and user activity before and after the object passes over platter 30, which also assists during instances of scan avoidance. In particular, a small object hidden in a hand of a user could be more difficult to hide from first imaging device 200 and second imaging device 300 simultaneously.

Figure 8:
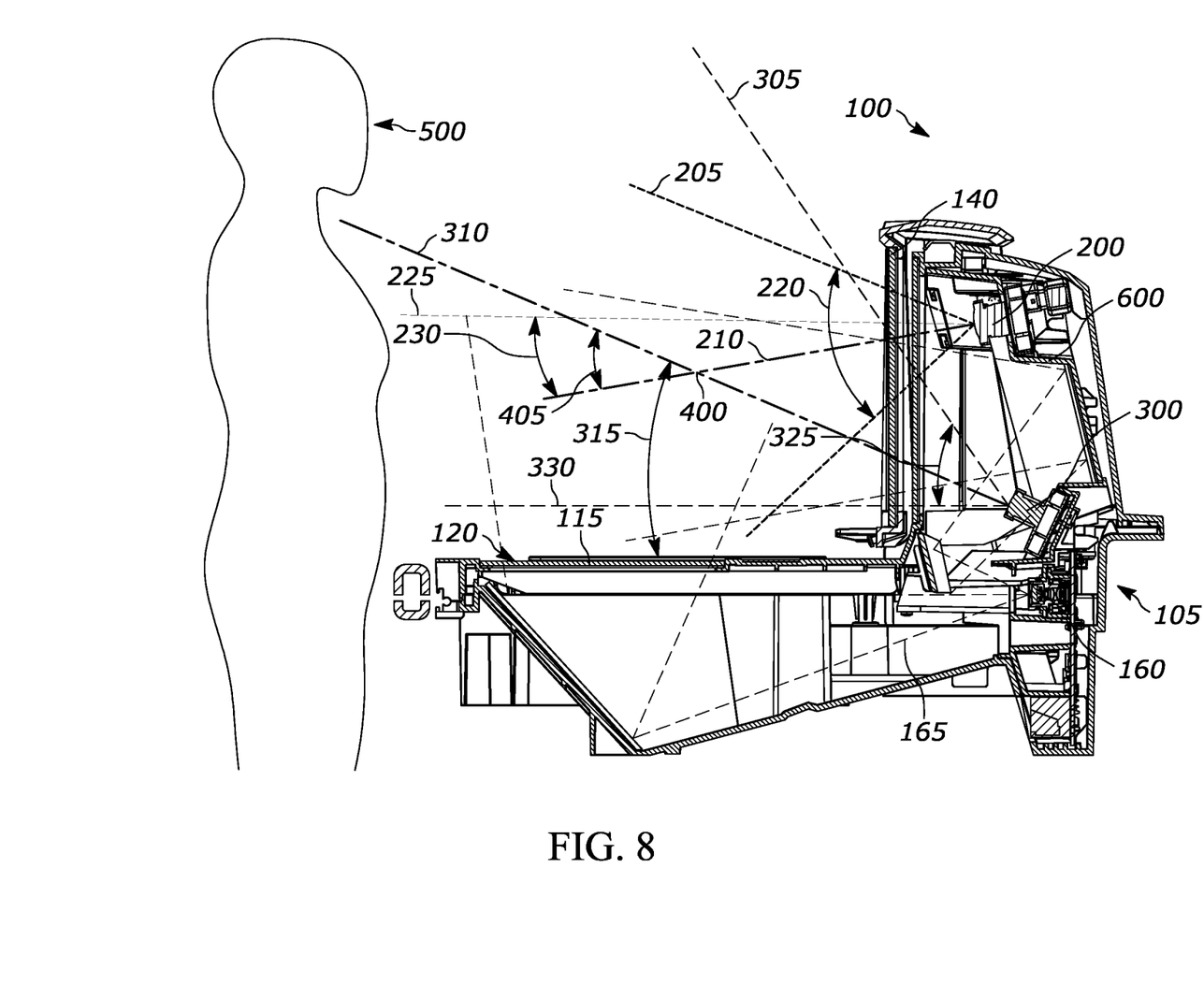
FIG. 8 illustrates a cross-sectional view of the bioptic barcode reader of FIG. 4, taken along line 8-8 of FIG. 7.

As shown in FIG. 8, first central imaging axis 210 of first field-of-view 205 and second central imaging axis 310 of second field-of-view 305 intersect at a point 400 that is located vertically above generally horizontal window 115 and at an intersecting angle 405 that is greater than or equal to 15 degrees and less than or equal to 55 degrees, is preferably greater than or equal to 20 degrees and less than or equal to 50 degrees, and is more preferably 35 degrees. First central imaging axis 210 and second central imaging axis 310 are also preferably vertically aligned along a longitudinal midline 155 (FIG. 5) of housing 105. However, due to manufacturing tolerances and the positioning of components within housing 105, it may not be possible to perfectly align first central imaging axis 210 and second central imaging axis 310 along longitudinal midline 155 and some offset, preferably within 1 inch of longitudinal midline 155, is acceptable.

Figure 9:
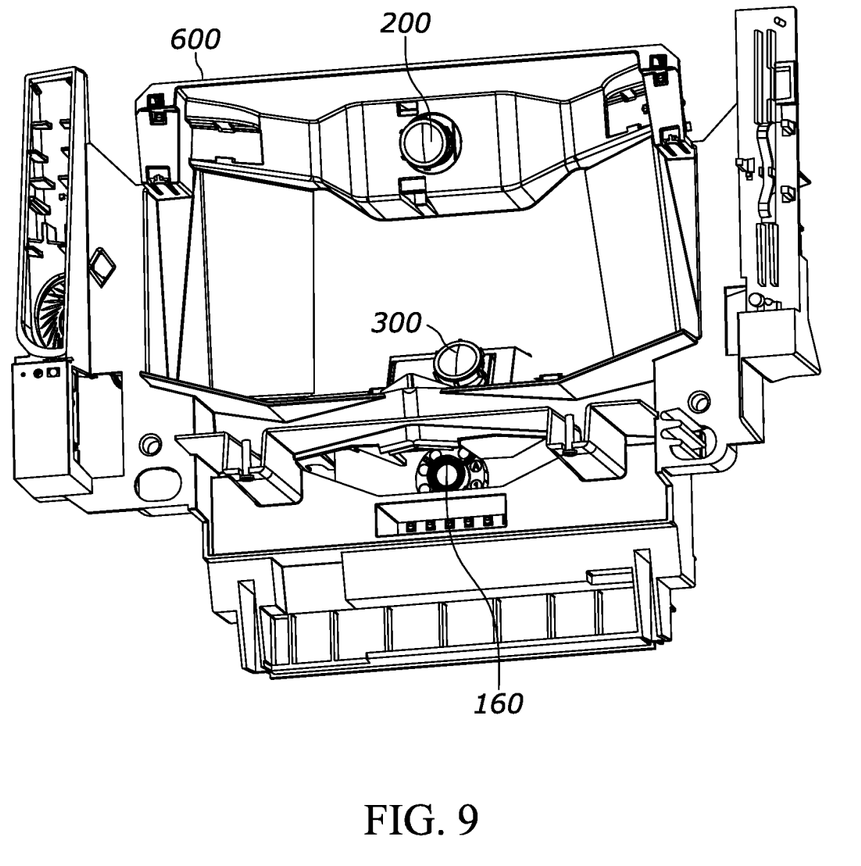
FIG. 9 illustrates a perspective view of an example carrier frame of the bioptic barcode reader of FIG. 4.

As can best be seen in FIGS. 8 and 9, in the example shown, barcode reading device 160, first imaging device 200, and second imaging device 300 are all removably mounted onto a carrier frame 600 that is positioned within housing 105. Carrier frame 600 is preferably a single, integral, unitary part that is configured to be inserted and removed from housing 105 as a single unit, with barcode reading device 160, first imaging device 200, and second imaging device 300 to simplify assembly, disassembly, and maintenance of bioptic barcode reader 100 and allow for easy field upgrade for first imaging device 200 and second imaging device 300.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A bioptic barcode reader, comprising:
   a housing comprising a generally horizontal window and an upright window;
   a barcode reading device positioned within the housing and having a barcode reading field-of-view directed out of at least one of the upright window or the generally horizontal window;
   a first imaging device, separate from the barcode reading device, positioned within the housing and having a first field-of-view directed out of the upright window, the first field-of-view having a direct line-of-sight from the first imaging device to the upright window with no fold mirrors;
   wherein a first central imaging axis of the first field-of-view extends upward above the generally horizontal window at an angle that is greater than 0 degrees relative to the generally horizontal window.

2. The bioptic barcode reader of claim 1, wherein the first central imaging axis is vertically aligned along a longitudinal midline of the housing.

3. The bioptic barcode reader of claim 1, further comprising:
   a platter having a platter window that is generally aligned over the generally horizontal window;
   wherein a center of the first imaging device is positioned along a plane that extends along a top surface of the platter.

4. The bioptic barcode reader of claim 1, wherein the first central imaging axis of the first field-of-view is directed out of a bottom half of the upright window.

5. The bioptic barcode reader of claim 1, wherein a bottom border of the first field-of-view of the first imaging device is parallel to a top surface of the generally horizontal window.

6. The bioptic barcode reader of claim 5, wherein the bottom border of the first field-of-view is within 0.5 inches of the top surface of the generally horizontal window.

7. The bioptic barcode reader of claim 1, wherein an angular width of the first field-of-view is greater than 80 degrees.

8. The bioptic barcode reader of claim 1, wherein:
   the housing includes a lower housing portion and an upper housing portion secured to and extending above the lower housing portion; and
   the first imaging device is positioned in a lower third of the upper housing portion and the first central imaging axis extends upward above a top surface of the generally horizontal window at a second angle that is greater than 0 degrees.

\* \* \* \* \*